(12) United States Patent
White

(10) Patent No.: US 6,775,449 B2
(45) Date of Patent: Aug. 10, 2004

(54) MULTIMODE OPTICAL FIBER HAVING REDUCED INTERMODAL DISPERSION

(75) Inventor: Whitney White, Chatham, NJ (US)

(73) Assignee: Fitel USA Corp., Norcross, GA (US)

( * ) Notice: Subject to any disclaimer, the term of this patent is extended or adjusted under 35 U.S.C. 154(b) by 212 days.

(21) Appl. No.: 10/106,633

(22) Filed: Mar. 26, 2002

(65) Prior Publication Data

US 2003/0185530 A1 Oct. 2, 2003

(51) Int. Cl.$^7$ .................................................. G02B 6/02
(52) U.S. Cl. ............................ 385/123; 385/27; 385/28
(58) Field of Search ............................. 385/27, 28, 123

(56) References Cited

U.S. PATENT DOCUMENTS

| | | | |
|---|---|---|---|
| 5,613,028 A | 3/1997 | Antos et al. ................. | 385/123 |
| 5,867,616 A | 2/1999 | Antos et al. .................. | 385/11 |
| 6,169,836 B1 * | 1/2001 | Sugiyama et al. .......... | 385/123 |
| 6,304,705 B1 | 10/2001 | Kalish et al. ................ | 385/128 |
| 6,519,401 B1 * | 2/2003 | Imamura et al. ............ | 385/123 |

* cited by examiner

Primary Examiner—Nimeshkumar D. Patel
Assistant Examiner—Sumati Krishnan
(74) Attorney, Agent, or Firm—Thomas, Kayden, Horstemeyer & Risley, LLP

(57) ABSTRACT

An optical fiber for use in optical energy transmission system has improved mode coupling in one embodiment thereof and both improved mode coupling and selective attenuation of unwanted modes in another embodiment. The optical fiber includes a plurality of particles of refractive index differing from that of the fiber core, in which the particles are distributed, and from that of the fiber cladding in which, in one embodiment, particles are distributed.

In fabricating the fiber, the particles are introduced into the preform from which the fiber is drawn, and, in a co-extrusion process, they are also introduced into the polymer prior to its being extruded with the core material.

13 Claims, 4 Drawing Sheets

MULTIMODE OPTICAL FIBER HAVING REDUCED INTERMODAL DISPERSION

FIELD OF THE INVENTION

This invention relates to multimode optical fiber having controlled mode coupling and/or selective mode attenuation, and to methods of making the fiber.

BACKGROUND OF THE INVENTION

Multimode optical fibers may have either a step index refractive profile or a graded-index refractive profile. In fibers with either type of index profile, the intermodal dispersion of an optical pulse propagating in the fiber typically contributes significantly to the spreading of the pulse, thereby limiting the bandwidth of the fiber for information transfer. Although graded-index structures are designed to minimize intermodal dispersion, practical limitations on industrially applicable manufacturing techniques often result in fibers with significant deviations from an optical index profile, and thus, fiber bandwidths well below that obtainable in an optimal fiber. This problem is especially pronounced in regard to plastic optical fiber.

It is well known that optical scattering in a multimode fiber not only increases optical attenuation, but can also decrease the intermodal dispersion of the fiber, either by producing coupling between the various propagating modes of the fiber, or by preferentially attenuating the modes primarily responsible for dispersion. However, because it is difficult to introduce mode coupling and differential mode attenuation in a controlled fashion, these remedies have not received significant commercial exploitation as methods for increasing the bandwidth of multimode optical fibers and communications systems using such fibers. In U.S. Pat. No. 6,304,705B1 of Kalish et al., issued Oct. 16, 2001, there is disclosed an optical energy transmission system having improved mode coupling. In that system, an optical fiber includes a plurality of particles formed in one or more coating layers surrounding the cladding layer of the fiber, and one or more buffer layers, but not in the core or cladding of the fiber. The particles cause perturbations, i.e., microbending, in the optical fiber which, in turn, enhance mode coupling, which produces a reduction in modal dispersion which, in turn, improves the bandwidth characteristic of fiber. The particles or bubbles in the outer coatings are not encountered by the light propagating through the core and cladding, but create stresses that alter the optical characteristics of the fiber. However, some instability may occur because of relaxation of the stresses within, for example, the buffer layer.

SUMMARY OF THE INVENTION

The present invention pertains to multimode optical fibers with novel structures, and their use in optical communications systems. In one embodiment, the invention comprises a multimode optical fiber with controllable mode coupling, which may be optimized to produce a desired level of mode coupling with minimal added optical attenuation. In another embodiment of the invention, the multimode fibers thereof controllably increase optical attenuation of certain modes with respect to that of other modes. The modes attenuated are those which must heavily contribute to dispersion. The fabrication processes of the invention produce these novel structures and are readily compatible with existing manufacturing techniques for either graded-index or step-index multimode fiber. They may also be optimized for a variety of optical fiber material systems, including silica glasses, as well as polymeric materials composed of either hydrocarbon polymers (e.g., polymethylmethacrylate or polycarbonate) or flourinated polymers such as poly(perfluoro-butenyl vinyl ether).

According to the invention, a communication system may be implemented by using an optical source and an optical detector, connected by a multimode optical fiber which contains particles within the core and/or the cladding layer whose refractive index is different from that of the surrounding fiber material. The refractive index structure introduced by the included particles may be imposed on a background refractive index structure of either a step-index or graded-index type of fiber. As optical pulses propagate through the fiber, they encounter the included particles and undergo scattering (and optionally absorption) thereby introducing mode coupling in the fiber. The size distribution, location, and refractive index of the particles may be chosen to produce a desired level of mode coupling, while suitably adjusting other parameters (e.g. by minimizing optical attenuation or by increasing differential attenuation of certain high-dispersion propagating modes with respect to other low-dispersion propagating modes). With the particles being contained in the core and cladding itself rather than in exterior coatings, greater mode coupling and greater stability results, inasmuch as there is no relaxation of the particle effect. The particles themselves operate directly on the light energy and not through the mechanism of microbending.

In a first embodiment of the invention, the multimode fiber is comprised of a polymer material with imbedded particles in the core thereof which are comprised, for example, of spherical beads composed of either silica glass, another polymer, or an electrically conductive material, or bubbles to control mode coupling with a minimum of optical attenuation. Such a fiber can be manufactured by dispersing the spherical scattering particles in a glassy polymer, and then using either a preform process or a co-extrusion process to produce from the glassy polymer step-index or graded-index optical fiber with imbedded particles.

In a second embodiment of the invention, fabricated by means of the co-extrusion process, scattering particles are added to the polymer material which forms the cladding layer of the fiber, thereby controlling the differential attenuation between the higher and lower order modes propagating within the fiber. Optionally, dispersal of the scattering spheres in the polymer material may be enhanced by appropriate chemical functionalization of the surfaces of the scattering particles. For example, silica spheres might be prepared with an organic surface treatment that enhances the solubility of the silica spheres in either an appropriate solvent or in the glassy polymer that forms the optical fiber. Such functionalized spheres can then be readily dispersed into a solvent and/or polymer solution to prevent the spheres from aggregating upon being mixed into the polymer.

In another embodiment of the invention, the multimode optical fiber is comprised of a silica glass, with imbedded particles comprised of an inorganic material. Optionally, such a fiber could be manufactured by dispersing the inorganic scatterers in a solution that is cast into a solid silica-based preform body using a sol-gel process. The resulting preform may then be drawn into an optical fiber using well-known methods. Optionally, chemical functionalization of the particle surfaces may be employed to promote dispersion.

The structures and techniques of the invention overcome problems inherent in prior art. For example, prior art structures and fabrication methods for multimode communications fiber often display reduced manufacturing yields associated with intermodal dispersion, resulting in higher manufacturing costs. Also, since the intermodal dispersion observed under conditions of restricted launch typically varies with the modal power distribution of pulses launched into the fiber, prior art communication systems often require relatively stringent conditions to benefit from restricted launch techniques. By introducing optical fibers with reduced intramodal dispersion and/or increased attenuation of certain optical modes, the invention offers the possibility for communications systems using simplified forms of restricted launch. The invention by allowing greater control over the mode coupling and differential mode attenuation of the multimode fiber in an optical communication system, enhances the ability of silica and polymer multimode fibers to serve as optical communication media.

DETAILED DESCRIPTION

According to the invention, it is possible to improve the characteristics of multimode optical communications systems by constructing these systems with multimode optical fibers containing imbedded particles in the core, or in the core and cladding, or in the cladding. In such systems, the imbedded particles serve to control the coupling between the various guided modes of the fiber (mode coupling) or to control the relative attenuation experienced by various propagating modes of the fiber (differential mode attenuation), by directly affecting the light waves, and not by microbending, as defined heretofore.

Figure 1A:
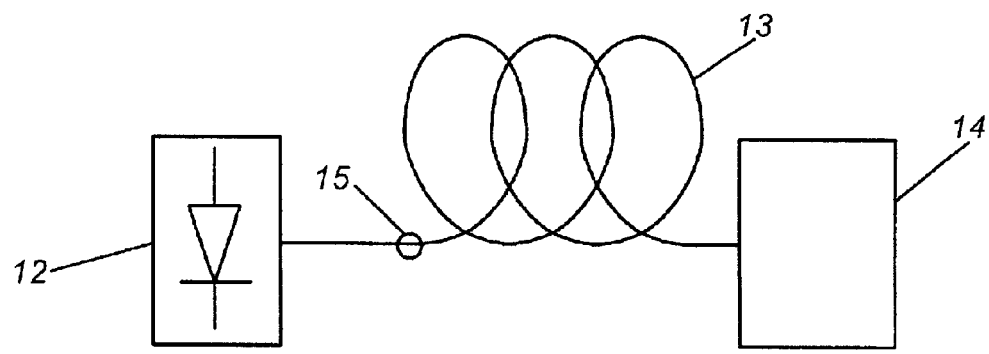
FIG. 1(a) is a schematic diagram of a communication system using the optical fiber of the present invention.
Figure 1B:
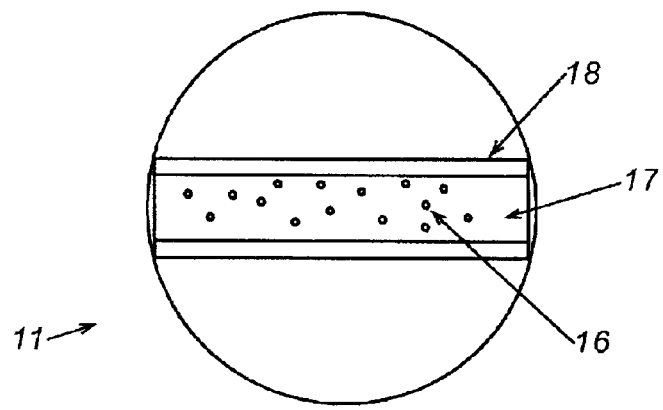
FIG. 1(b) is an enlarged view of fiber of one embodiment of the invention as used in the system of FIG. 1(a)

A schematic diagram of such a communication system 11 is shown in FIG. 1(a). As illustrated in this figure, an optical source 12 launches optical pulses in a multimode optical fiber 13 in a manner such that a significant portion of the power in these pulses is guided by the optical fiber. In general, the optical power launched into the fiber will be distributed among numerous electromagnetic modes of the fiber. As an optical pulse propagates through the fiber, the portion of the optical power that is distributed into a given propagating mode experiences a longitudinal propagation velocity and an optical attenuation that is characteristic of that mode. In the absence of intermodal coupling or differential attenuation between modes, the optical pulse received at the detector 14 is just the superposition of signals associated with the optical pulse traveling in the various guided modes of the fiber. Since the various guided modes typically have somewhat differing propagation velocities along the fiber axis, the pulse signal arriving at the detector is undesirably broadened by this intermodal dispersion. FIG. 1(b) is an enlarged detail of a short length of fiber 13 at point 15.

Figure 2:
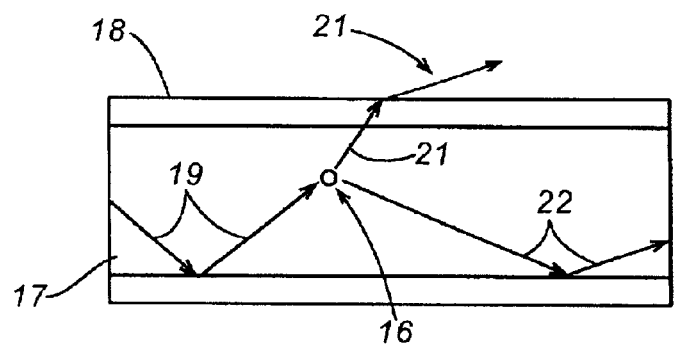
FIG. 2 is a diagrammatic view of the fiber of the invention illustrating the effect upon light rays passing therethrough.

According to the invention, scattering particles 16 may be introduced into the multimode fiber 13, as shown in FIGS. 1(b) and 2, to produce coupling between or among the guided modes. The fiber 13, as shown in FIG. 1(b) comprises a core 17, a cladding 18, and scattering particles 16. FIG. 2 demonstrates diagrammatically the effect of a scattering particle 16 on an incident guided light ray 19. Particle 16 scatters the ray 19 into a non-guided ray 21 which is lost, thereby attenuating the light ray 19, and into a guided (mode coupling ray) ray 22. If the coupling between modes is sufficiently strong, the optical power coupled into a given mode at the launch will subsequently be scattered into numerous different modes during its transit through the fiber. As a result, the constituent photons of the pulse will each sample numerous propagating modes of the fiber. Thus, their average propagation delay will reflect a weighted average of the various modal propagation velocities, and their distribution of propagation delays will be narrower than it would be in the absence of mode coupling.

Also, if the particles 16, which may be beads of silica glass or another polymer, or an electrically conductive material, or an inorganic material, all of which have a different index of refraction than the fiber material, scatter power out of the fiber from certain guided modes, they will also serve to increase the optical attenuation of those modes. Since the higher order modes of the fiber often contribute disproportionately to intermodal dispersion, it is possible to narrow the width of received pulses by increasing the optical attenuation of these modes. Since only the higher order modes carry optical power near the periphery of the fiber core 17, an increase in the attenuation of higher order modes may be had by an increase in the number density (or scattering cross section) of the scattering particles 16 near the core periphery.

In the case that the scattering particles are spheres with a diameter comparable to the wavelength of the incident light, the scattering of the incident optical power may be estimated by use of Mie scattering theory. According to the Mie scattering theory, a sphere of radius a, and index $n_s$, imbedded in a uniform medium of refractive index $n_f$, will scatter a polarized, plane-wave incident light beam according to the formulae $$I_\perp(\theta) = \frac{\lambda^2}{n_f^2 4\pi^2 r^2} \left| \sum_{k=1}^{\infty} (-i)^k \left[ {}^e B_k \cdot \frac{P_k^{(1)}(\cos\theta)}{\sin\theta} - {}^m B_k \cdot P_k^{(1)'}(\cos\theta) \cdot \sin\theta \right] \right|^2 \quad (1)$$

$$I_\parallel(\theta) = \frac{\lambda^2}{n_f^2 4\pi^2 r^2} \left| \sum_{k=1}^{\infty} (-i)^k \left[ {}^e B_k \cdot P_k^{(1)'}(\cos\theta) \cdot \sin\theta - {}^m B_k \cdot \frac{P_k^{(1)}(\cos\theta)}{\sin\theta} \right] \right|^2$$

Here $I_\perp \theta$ is the dependence of the scattering intensity (in arbitrary units) as a function of scattering angle θ, for a beam polarized perpendicular to the scattering plane. $I_\parallel(\theta)$ is the equivalent scattering intensity function for an incident beam polarized parallel to the scattering plane. λ is the vacuum wavelength of the incident photons, and $n_s$ may be complex, but is purely real in the case of a dielectric particle. The $P_k^{(1)}(\cos\theta)$ are the associated Legendre functions of the first kind defined with regard to the Legendre polynomials $P_k(\cos\theta)$. Accordingly, $$P_k^{(1)}(\cos\theta)=\sin(\theta)\,dP_k(\cos\theta)/d(\cos\theta).$$

Finally, the coefficients $^eB_k$ and $^mB_k$ are given by $$^eB_k = i^{k+1} \cdot \frac{2k+1}{k(k+1)} \cdot \frac{\tilde{n}\psi_k{}'(\rho)\psi_k(\tilde{n}\rho) - \psi_k(\rho)\psi_k{}'(\tilde{n}\rho)}{n\xi_k^{(1)'}(\rho)\psi_k(\tilde{n}\rho) - \xi_k^{(1)}(\rho)\psi_k{}'(\tilde{n}\rho)} \quad (2)$$

$$^mB_k = i^{k+1} \cdot \frac{2k+1}{k(k+1)} \cdot \frac{\tilde{n}\psi_k(\rho)\psi_k{}'(\tilde{n}\rho) - \psi_k{}'(\rho)\psi_k(\tilde{n}\rho)}{n\xi_k^{(1)}(\rho)\psi_k{}'(\tilde{n}\rho) - \xi_k^{(1)'}(\rho)\psi_k(\tilde{n}\rho)}$$

Here, $n=n_s/n_f$ is the relative scattering index, $P=2\pi a/n_f\lambda$ is the normalized radius of the scattering sphere, $\Psi_k(\rho)=(\pi\rho/2)^{1/2}J_{k+1/2}(\rho)$, where the $J_{k+1/2}(\rho)$ are the Bessel functions of the first kind, and $\xi_k(\rho)=(\pi\rho/2)^{1/2}H^{(1)}{}_{k+1/2}(\rho)$, where the $H^{(1)}{}_{k+1/2}(\rho)$ are the Neumann functions.

For an unpolarized incident beam, the scattered intensity will be described by $$I_s(\theta)=[I\bot(\theta)=I_{||}(\theta)]/2$$

By comparing the scattered intensity integrated over all angles with the incident intensity integrated over the surface of the scattering particle, it is possible to calculate the scattering efficiency, $Q_{sca}$ of the particle 16. $Q_{sca}$ is defined as the ratio of total scattered power to total incident power. In turn, we may also calculate the effective cross sectional area, $A_x$, of the scattering particle, defined as $Q_{sca}$ multiplied by $\pi a^2$, the geometric cross sectional area of the particle.

Figure 3:
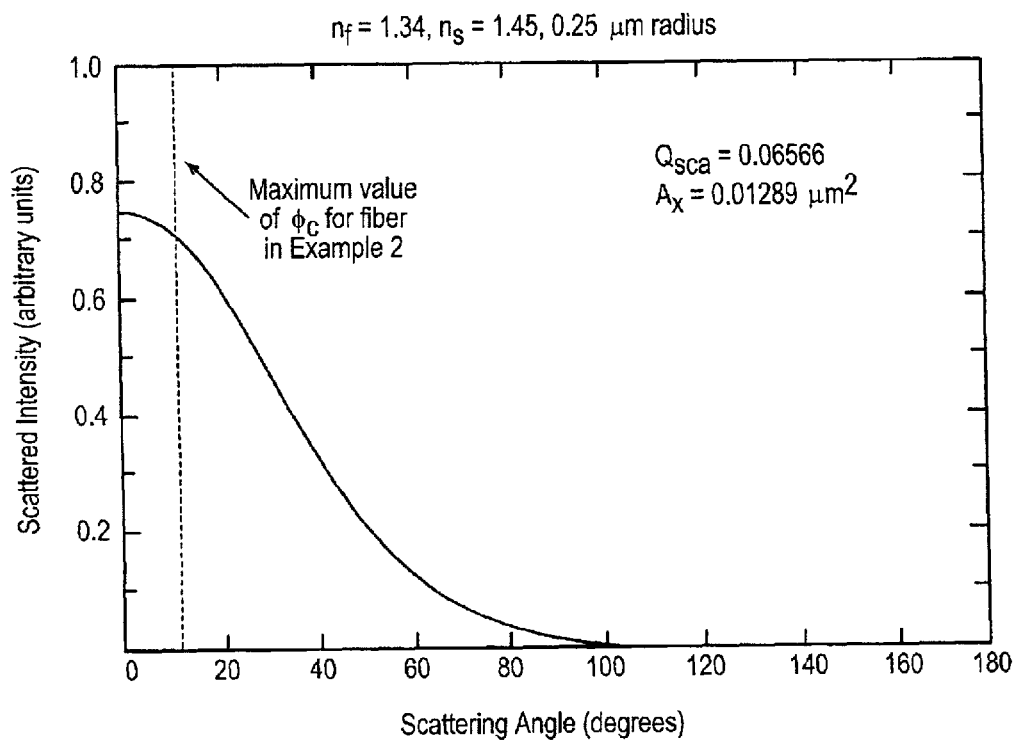
FIGS. 3 and 4 are graphics illustrating the scattering intensity versus scattering angle for light rays within the fiber of the invention for various values of certain parameters of the fiber of the invention.

FIG. 3 shows $I_s(\theta)$, $Q_{sca}$, and $A_x$ as calculated for a particle 16 with a=0.25 $\mu$m, $n_s$=1.45, and $n_f$=1.34. If many such particles are randomly distributed in the medium, and are separated by a distance large compared to $\lambda$, coherent scattering effects may be neglected. In this case, the total scattered intensity will just be the sum of the scattering intensity from each of the particles.

For sufficiently large optical fiber core diameters, a ray approximation may be used to describe the light propagating through the optical fiber. In this case, the Mie scattering calculation may readily be adapted to estimate the mode coupling and attenuation produced by imbedded particles. For each particle 16, the incident optical power may be represented as a collection of rays, each propagating at a different angle $\Phi$ with respect to the axis of the optical fiber. After impinging upon the particle, some fraction of the power in each of these rays will be scattered into a distribution of new rays, each propagating at a different angle $\Phi'$ ($\Phi$, $\theta$, r) with respect to the axis of the optical fiber. Here, r, is a vector quantity describing the location of the scattering particle. In those cases where the scattered rays have $\Phi'$ less than some critical angle $\Phi_c$, the scattered ray will be guided by the optical fiber, and the scattering ray will represent intermodal coupling between guided modes. In those cases where $\Phi'>\Phi_c$, the scattered ray will not be guided, and the scattered ray will represent power lost to optical attenuation. In a step-index optical fiber, $n_f$ and $\Phi_c$ will be constant throughout the fiber core, and $\Phi_c$ will be defined by the condition $\sin(\Phi_c)=n_A$, where $n_A$, is the numerical aperture of the fiber. In a graded-index optical fiber, the refractive index $n_f$, as well as the critical angle $\Phi_c$ will vary with the radial location of the imbedded particle. In either case, the intermodal coupling strength and particulate contribution to attenuation may be calculated by using the Mie estimate for scattering cross section, performing a weighted sum over incident angles appropriate to a given modal power distribution, and performing an average over the possible locations of scattering particles. In such fashion, it is possible to estimate the evaluation of the modal power distribution as a signal propagates through a fiber containing a known, cylindrically symmetric distribution of randomly located scattering particles.

Some useful guidelines may be deduced from the above discussion without detailed calculation. To design a fiber which increases mode coupling with a minimal increase in attenuation, the size and refractive index of the imbedded particles should be chosen to permit multiple scattering events with minimal coupling to non-guided modes. Since the non-guided modes are characterized by $\Phi>\Phi_c$, this implies that the particles should be chosen so that the width of the forward scattering (low $\theta$) peak in $I_s(\theta)$ is much less than $\Phi_c$. (In the case of a graded-index fiber, the relevant value of $\Phi_c$ is the maximum value of $\Phi_c$) Also, the number density of the particles should be chosen from the scattering cross section so that each ray will be scattered several times on average in the course of propagating through a typical length of a communications link. For the multimode fiber types discussed in the invention, the link lengths of interest are typically of order 100 meters.

In accordance with the invention, it is also possible to use the imbedded particles for the primary purpose of differentially attenuating certain modes. In this case, very different design criteria apply. Here, the function of the particles is to maximize attenuation of the detrimental modes of coupling rays associated with those modes into non-guided rays, or by absorbing incident rays. If dielectric particles are used to produce scattering, the size and refractive index of the imbedded dielectric particles should be chosen so that the width of the forward scattering peak in $I_s(\theta)$ is comparable to or even greater than $\Phi_c$. Also, the location of the particles within the fiber should be chosen so to maximize their spatial overlap with detrimental modes, compared to their overlap with desired modes. For instance, if the higher order modes in a graded-index fiber contribute disproportionately to intermodal dispersion, one may improve the performance of the fiber by preferentially attenuating those modes. According to the invention, the scattering particles in this case would be placed near the periphery of the fiber core, since the higher order modes have a much higher optical power density near the core periphery than do the lower order modes. Conversely, a fiber design that is intended to preferentially attenuate lower order modes would incorporate particles primarily near the core center.

In a polymer optical fiber, it is possible to incorporate either organic or inorganic particles, since the maximum fabrication temperatures encountered in a polymer fiber particles, since the maximum fabrication temperatures encountered in a polymer fiber fabrication process typically do not exceed 300° C. According to the invention, the scattering particles may be incorporated into bulk polymer material, and the resulting polymer particle composite may then be processed into an optical fiber by either a preform or an extrusion method. In cases where the particles are only desired in a portion of the fiber, the polymer composite material would be confined to a given layer(s) of the preform or to a given material stream in a co-extrusion process.

In principle, scattering particles may be introduced directly into the polymer melt in an aerosol or powder form. In practice however, the high viscosity and limited chemical stability of most polymer melts considerably complicate such a process. A more practical approach is to introduce the scattering particles as into a low viscosity monomer solution or polymer/solvent solution to promote dispersion. The resulting mixture may then be either polymerized and/or dried of solvent by evaporation. Depending on the composition and number density of the scattering particles, the particles may require a surface treatment to prevent them from aggregating in the solution and/or in polymer. Many such techniques are well known, including that of chemically attached polymer chain ends to the particle surfaces, or otherwise chemically functionalizing the surfaces. When particles with attached polymer chains are introduced in a solution that is a good solvent for the attached chains, those chains must be compressed to allow the particles to approach each other. Thus, the attached chains produce a repulsive force between particles, thereby stabilizing the dispersion against aggregation.

For a silica fiber, the fiber fabrication process almost always involves very high temperatures, so that only inorganic scattering particles are likely to be suitable. According to the invention, the scatterers may be introduced into a silica-based preform in an aerosol or precipitated vapor form, or by dispersing the scatterers in a solution that is cast into a solid silica preform body using a sol-gel process. The resulting preform may then be drawn into an optical fiber using well-known methods. Optionally, chemical treatment of the particle surfaces may be employed to promote dispersion.

According to the invention, therefore, an improved or simplified communication connected by a multimode optical fiber which contains particles whose refractive index is different from that of the surrounding fiber material. The imbedded scattering particles may be used to produce coupling of propagating modes, to selectively attenuate detrimental modes, or to perform both functions within the same fiber. As a result, the information carrying capacity of the fiber may be improved, its manufacturing cost may be reduced, and its application in a restricted launch communications may be simplified.

The invention will be further clarified with the following examples, which are intended to be exemplary, and not restrictive:

EXAMPLE 1

A step-index silica fiber may be made by a preform process, in accordance with the prior art. In this process, the preform consists of a silica core layer, surrounded by cladding layer consisting of flourine-doped silica. After this preform is drawn into an optical fiber, the resulting fiber demonstrates a large degree of intermodal dispersion, due to the step index nature of the fiber. According to the invention, the bandwidth of the resulting fiber is improved by incorporating scattering particles in the preform prior to drawing the fiber.

Figure 4:
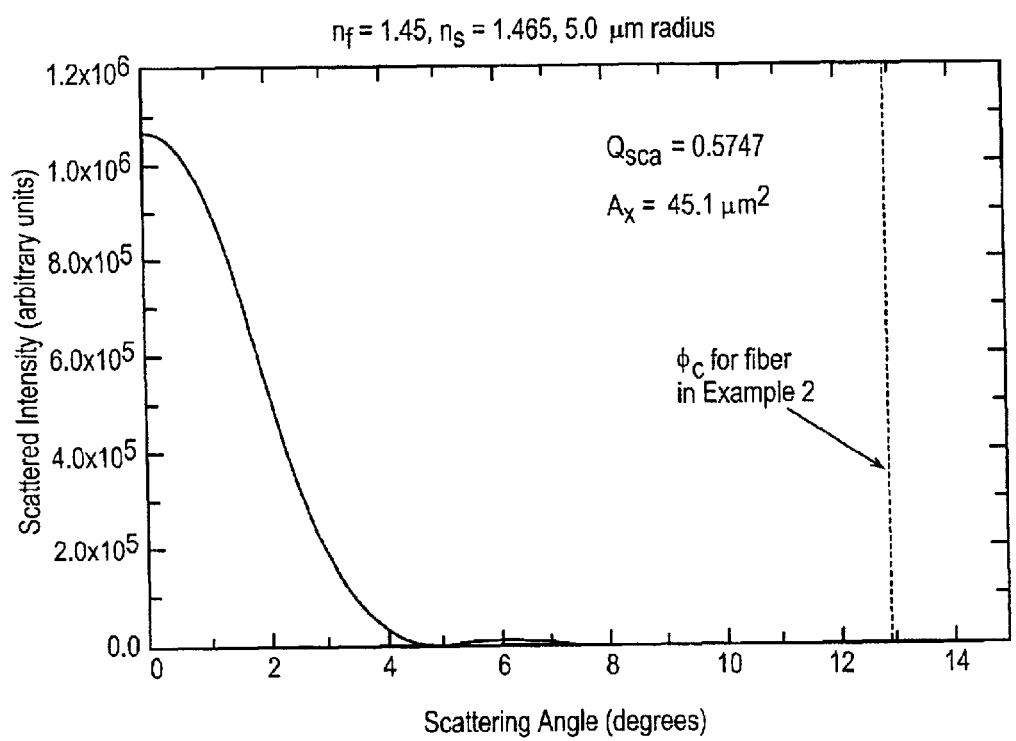

The core for the preform may be formed by a silica sol-gel process, and scattering particles having a glass transition temperature or melting temperature considerably higher than the glass transition temperature of silica may be added before gelation. After the core is formed, a surrounding flourinated doped silica layer may be added by standard methods, including vapor deposition or a rod-in-tube overcladding process. In this case, the imbedding medium will have a refractive index of 1.45, and the particles may be chosen to have a refractive index of approximately 1.465. FIG. 4 shows the Mie theory calculation of the angle dependent scattering intensity expected for these parameters, assuming that the particle radius of 5.0 $\mu$m is chosen. Since fibers of this type typically have a numerical aperture of roughly 0.22 $\Phi_c$ for this fiber will be about 12.7°. As shown in FIG. 4, the vast majority of the scattering light from the particles is directed at much smaller angles, so that for most incident guided rays, many scattering events may occur before the scattered rays are no longer guided by the fiber. FIG. 4 also indicates the calculated effective cross section for each particle, $A_x$=45.1 $\mu$m$^2$.

A suitable number density, N, of particles may be chosen from the criterion that a typical photon should be scattered many times during a transit of ~100 meters of fiber. If the core radius of the fiber is denoted by R, the total number of scattering particles contained in a length L will be N$\pi$R$^2$L. On average, each photon may be expected to undergo a single scattering event over a scattering length $L_s$ such that the sum of effective cross sectional areas of the included particles is approximately equal to the cross sectional area of the fiber. Hence, the scattering length $L_s$ may be approximated as $$N\pi R^2 L_s A_x = \pi R^2 \rightarrow L_s = 1/(NA_x)$$

Thus, to obtain a scattering length $L_s$=5 meters, one would choose a particle number density of N=4435 cm$^{-3}$. This number density corresponds to a volume fraction of 2.32× 10$^6$ of scattering particles.

EXAMPLE 2

Figure 5:
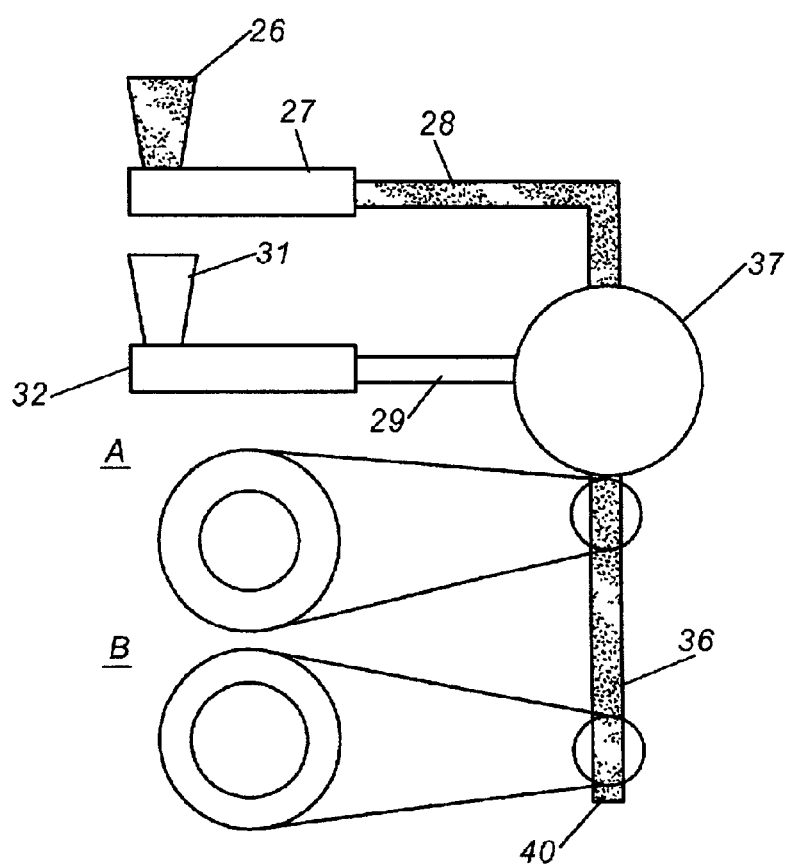
FIG. 5 is a schematic diagram of the co-extrusion process for making certain embodiments of the invention.

A graded-index polymer fiber may be produced by a co-extrusion process, in accordance with prior art methods. As illustrated in FIG. 5, a suitable polymer and dopant from source 26 is extruded by extruder 27 into a core stream 28 of relatively high refractive index which is joined into a coaxial flow with a polymer melt stream ("Clad stream") 29 of relatively low refractive index from source 31 and extruder 32. After joining into a coaxial flow 33 in crosshead 37, both streams flow through a heated tube, wherein the dopant material diffuses in to the material in the clad stream, thereby forming a graded refractive index and then pass through an extrusion die 40.

Since dopant diffuses outward from the core stream during this fabrication process, the diameter of the core increases compared to the diameter of the cladding during the diffusion step as shown by the detail cross-sections A and B. After exiting a die, the resulting melt stream is cooled and drawn into a graded-index optical fiber. Since the graded index profile formed in this process typically contains long diffuse tails, the higher order modes in such a fiber contribute disproportionately to the intermodal dispersion of the fiber. Thus, the bandwidth of this fiber may be improved by differential particles to the clad stream polymer material 29 results in increased scattering at the periphery of the core, producing the desired differential mode attenuation.

If polymer fiber in this example is poly(perfluoro-butenyl vinyl ether), the refractive index $n_f$ of the imbedding polymer medium is approximately 1.34 at the edge of the core at 850 nm wavelength. If the core stream is composed of the same polymer mixed with 10% (by weight) of chlorotriflouroethylene heptamer, then the refractive index will increase to approximately 1.356 near the center of the core. If the imbedded particles are composed of silica glass, their refractive index is 1.45. Accordingly, if the particles have radius a=0.25 $\mu$m, the angle dependent scattering intensity from each particle near the core periphery will behave as shown in FIG. 3. As this figure shows, a large fraction of the light scattered in this example is scattered at angles that considerably exceed the maximum value of $\Phi_c$~12.0°. Thus, almost all of the scattered light will not be guided by the fiber, and the imbedded particles will serve primarily to attenuate the higher order modes.

As in the previous example, a suitable number density of particles, N, may be chosen from the criterion that the photons that enter the particle-containing region should be scattered every few meters. Hence, to obtain $L_s$~5 meters, given the calculated value of effective cross section $A_x$=0.01289 $\mu m^2$, one should chose $N=1/A_x L_s$~$1.55 \times 10^7$/$cm^3$. This number density corresponds to a volume fraction $1.01 \times 10^{-6}$ of scattering particles in the cladding polymer.

The principles and features of the present invention have been set forth in the foregoing. It is to be understood, however, that the various features of the present invention might be incorporated into other optical fibers and that other modifications or adaptations might occur to workers in the art. All such variations and modifications are intended to be included herein as being within the scope of the present invention as set forth. Further, in the claims hereinafter, the corresponding structures, materials, acts and equivalents of all means or step-plus-function elements are intended to include any structure, materials or acts for performing the functions in combination with the elements as specifically claimed.

What is claimed is:

1. An optical waveguide comprising a multi-mode optical fiber for propagating in high order modes and low order modes therethrough, wherein independent propagating between different order modes causes degrading of the signal propagating therethrough, said optical fiber having a core region having a first index of refraction and a cladding region having a second index of refraction different from said first index surrounding said core region, a portion of the high order modes being propagated in the peripheral region of said waveguide and the propagation region of the low order mode being concentrated in the central region of the core;
    a plurality of particles having a third index of refraction different from said first and indices disposed within said waveguide for inducing mode coupling or differential mode attenuation in the signal energy by differentially altering the propagation of selected modes, said particles having a density distribution within said waveguide that is greatest in the propagation region of the modes to be principally affected by said particles.

2. An optical waveguide as claimed in claim 1 wherein said particles are disposed within said core region.

3. An optical waveguide as claimed in claim 1 wherein said particles are disposed within said cladding region.

4. An optical waveguide as claimed in claim 1 wherein said particles are disposed in both said core region and said cladding region.

5. An optical waveguide as claimed in claim 1 wherein the surfaces of said particles are chemically functionalized to promote dispersion of said particle within said waveguide.

6. An optical waveguide as claimed in claim 1 wherein said multi-mode optical fiber comprises a polymer material and said particles comprise substantially spherical beads dispersed with said fiber.

7. A multimode optical fiber as claimed in claim 6 wherein said beads comprise silica glass.

8. A multimode optical fiber as claimed in claim 6 wherein said beads comprise an electrical conductive material.

9. A multimode optical fiber as claimed in claim 6 wherein said beads comprise a polymeric material.

10. A multimode optical fiber as claimed in claim 6 wherein said beads comprise an inorganic material.

11. A multimode optical fiber as claimed in claim 6 wherein said optical fiber is a step-index fiber.

12. A multimode optical fiber as claimed in claim 6 wherein said optical fiber is a graded index fiber.

13. An optical waveguide system for transmitting optical energy signal pulses comprising:
    a source of optical energy signal pulses;
    an optical energy transmission medium connected to said source for transmitting energy from said source in a plurality of modes of high order and low order wherein said transmission medium comprises a core portion and a cladding surrounding said core;
    said transmission medium including said core and or said cladding having a plurality of particles therein for scattering at least portions of the optical energy in at least some of the high order modes being transmitted therethrough; and
    a receiver connected to said transmission medium for receiving signal energy from said source.

* * * * *